United States Patent [19]

Waldmann

[11] 4,122,046
[45] Oct. 24, 1978

[54] ELASTOMERIC AND FIBROUS POLYMERIC MATERIALS

[76] Inventor: John Joseph Waldmann, 220 E. Drewry La., Raleigh, N.C. 27609

[21] Appl. No.: 587,685

[22] Filed: Jun. 17, 1975

[51] Int. Cl.$^2$ .................... C08F 4/16; C08F 22/38
[52] U.S. Cl. .................... 521/93; 204/159.22; 204/159.23; 260/45.7 R; 260/45.7 P; 260/45.9 R; 526/123; 526/172; 521/149; 528/56; 528/75; 528/119; 528/368
[58] Field of Search .................... 204/159.22, 159.23; 260/2.5 FP, 2.5 N, 45.7 R, 45.7 P, , 45.9 R, 78.5 R, 79, 79.5 R, 80.3 N, 80.73, 86.1 N, 89.7 R; 526/11.1, 123, 172

[56] References Cited

U.S. PATENT DOCUMENTS 3,090,761 5/1963 Backlund et al. ............ 260/2.5 N

*Primary Examiner*—Harry Wong, Jr.
*Attorney, Agent, or Firm*—Cushman, Darby & Cushman

[57] ABSTRACT

Elastomeric, chemically stable, flame resistant polymers are obtained by polymerizing acrylamide or mixtures of acrylamide and at least one ethylenically unsaturated monomer copolymerizable therewith in the presence of a catalyst having the structure:

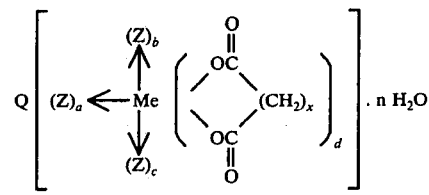

wherein:
Q = Na, K, NH$_4$, Ca or Ba
n = 2 to 5

$Z = O, H_2O, -OH$ and

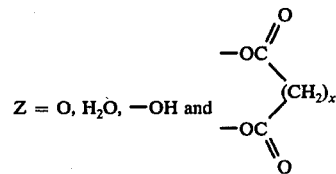

Me = Ti, Mn, Mo, Zr or W
$x = 0$ to 1
$a, b, c$ each = 0 to 1
$a+b+c+d$ = valence of Me.

The catalyst may be used alone as well as with UV, electron beam, ionizing radiation and combinations of these and with general redox systems known in the literature.

40 Claims, No Drawings

ELASTOMERIC AND FIBROUS POLYMERIC MATERIALS

BACKGROUND OF THE INVENTION

1. Field of the Invention

This invention relates to novel polymers and copolymers of acrylamide and to methods for their preparation.

2. Description of the Prior Art

The polymerization of acrylamide alone or with ethylenically unsaturated monomers in the presence of catalysts of the free radical type or redox type or in the presence of radiation is well known. Typical of such catalyst systems are the following described in the indicated references.

| Catalyst System | Reference |
| --- | --- |
| 1. Hydrogen Peroxide - $Cu^{++}$-thiourea | USP # 3,255,072 |
| 2. Ammonium persulfate - Sodium metabisulfite - EDTA | USP # 3,442,803 |
| 3. Potassium persulfate - $Fe^{++}$- Metabisulfite | USP # 3,316,181 |
| 4. Ammonium persulfate - $Cu^{++}$- Sodium bisulfite | USP # 3,332,922 |
| 5. Potassium persulfate - Sodium metabisulfite | USP # 3,450,680 |
| 6. Sodium bromate - Sodium sulfite | (Pat. No. unknown) |
| 7. Ammonium persulfate - 3,3',3'' - nitrilotrispropionamide | USP # 3,002,960 |
| 8. Free radicals | So. Africa Patent 69-1, 065/969 |
| 9. Spray drying of catalyst | USP # 3,644,305 |
| 10. $Co^{60}$- gamma ray | Brit. Pats. 1,139,917/ 1969 and 1,337,109/1973 |
| 11. $Co^{60}$ - gamma ray or presence of systems: benzoil peroxide - N,N'-dimethylaniline; t. - butylhydroperoxide - N,N' - dimethylaniline | Chemical Abstracts 1969 |
| 12. $Co^{60}$- gamma ray or in the presence of complex of potassium diaquodioxalo manganese $\{K\;[Mn\;(C_2O_4)_2\;(H_2O)_2]\}$ | USP # 3,736,241 |

The above described catalyst systems are not without their shortcomings, however, in polymerization reactions involving acrylamide. First of all, the presence of air cannot be tolerated in acrylamide polymerizations employing these catalyst systems for the excess oxygen prematurely terminates the reaction resulting in a final product having an undesirably low molecular weight. Consequently, it is necessary with these catalyst systems to either evacuate the reaction vessel of air prior to initiating the polymerization or to effect the polymerization in the presence of an inert gas such as nitrogen or argon.

Other disadvantages associated with these catalysts is the fact that the conversion is less than one hundred percent and the time of reaction is unduly long, requiring in general in excess of twelve hours.

A further objection, in addition to the inert atmosphere required, to the use in acrylamide polymerizations of the initiator complex described in U.S. Pat. No. 3,736,241 for the polymerization of acrylonitrile is that the catalyst decomposes to evolve noxious carbon monoxide.

SUMMARY OF THE INVENTION

Accordingly, it is a principal object of this invention to provide novel polymers and copolymers of acrylamide by a method wherein the presence of air is immaterial and virtually complete conversion of the monomer reactant or reactants is obtained.

Another object of the invention is to provide a method for acrylamide polymerization wherein the time of reaction is considerably shorter than that of prior art processes and no objectionable gases are produced by the reaction.

Yet another object of the invention is to provide novel film-forming and fiber-forming polymeric materials.

A further object of the invention is to provide novel foamed and unfoamed polyimides from commercially available materials which polyimides have a high resistance to chemical attack, and a low specific gravity as, for instance, less than 0.5.

A still further object of the present invention is to prepare polyimides possessing high fire retardant properties which polyimides do not depend on the addition of inorganic halide or halogenated organic additives for their flame retardant properties.

Other objects and advantages of the invention will become apparent from the following description.

The objects and advantages of the present invention are achieved by polymerizing in a liquid medium a member of the group selected from acrylamide and mixtures of acrylamide and at least one ethylenically unsaturated monomer copolymerizable therewith in the presence of a catalyst having the structure:

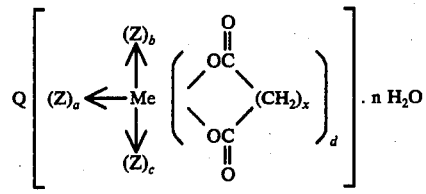

wherein:
Q = Na, K, $NH_4$, Ca, Ba or metals of group IA and IIA.
n = 2 to 5

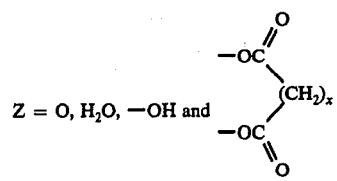

Z = O, $H_2O$, —OH and

Me = Ti, Mn, Mo, Zr, W or other multi-valent metals
x = o to 1
a,b,c each = 0 to 1
a+b+c+d = valence of Me

DETAILED DESCRIPTION OF THE INVENTION

Unlike the catalyst systems noted above, including UV and ionizing radiation, the catalysts employed in the method of the present invention are not free radical initiators. With radical initiators acrylamide can polymerize to polymers with C—C chains as follows:

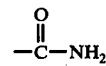

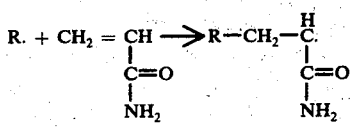

The catalysts of this invention are in equilibrium solutions such as

where K** is the transition constant of the reaction. The catalysts improve the resonant structure of the acrylamide in solution, as for example:

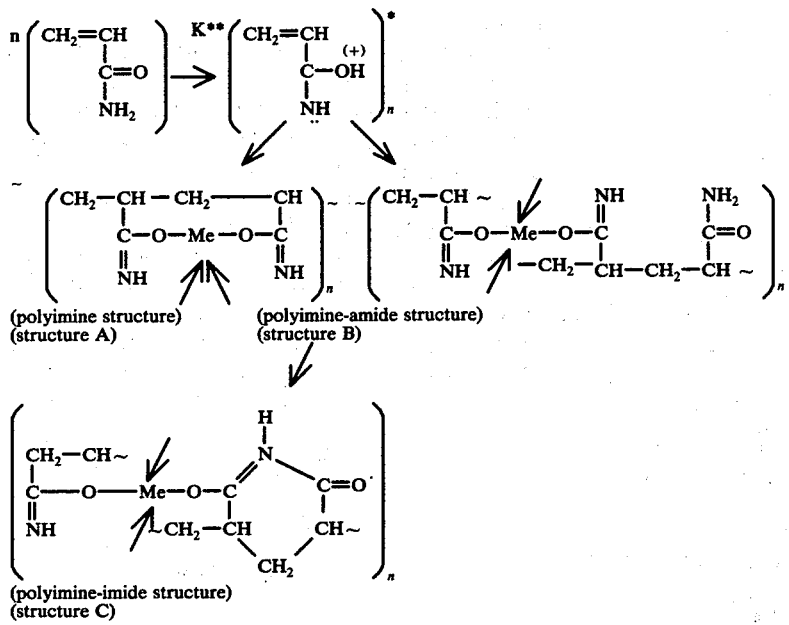

(polyimine structure) (structure A)

(polyimine-amide structure) (structure B)

(polyimine-imide structure) (structure C)

The catalysts of the invention, in contrast to the catalyst systems noted previously, polymerize acrylamide and mixtures of acrylamide and ethylenically unsaturated monomers via the imine-linkages in the following manner:

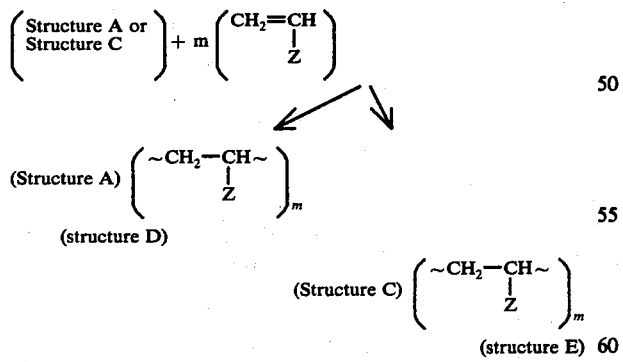

While the exact mechanism of the polymerization reaction is not clearly understood it is believed that it proceeds via amide anions which are probably formed by a $H^{(+)}$ shift from the amino group to the ceto carbonyl. Thus, while there is no desire to be held to any particular theory of operation, it has nevertheless been demonstrated that polymer compositions prepared by the method of this invention are polyimides as opposed to C—C chained polymers containing amide, i.e.

$$-\overset{\overset{O}{\|}}{C}-NH_2$$

appendages and possess unique and in many respects superior properties to those prepared by the heretofore known methods.

Another surprising advantage of the method of the invention resides in the unexpected finding that the oxalate complex catalysts employed in the polymerization breakdown to harmless carbon dioxide. On the other hand, other oxalic radical generating catalysts such as the oxalic complex, manganese diaquodioxalate potassium, employed in the polymerization of U.S. Pat. No. 3,736,241 in addition to forming C—C backbone polymers, as aforementioned, breakdown into toxic carbon monoxide.

Among the suitable catalysts contemplated for use in the method can be included the following:
Compound 1: $K[Mn(C_2O_4)_2(H_2O)_2] \cdot 2H_2O$
Compound 2: $K[Mn(C_3H_2O_4)_2(H_2O)_2] \cdot 2H_2O$
Compound 3: $(NH_4)_2[TiO(C_2O_4)_2] \cdot 3H_2O$
Compound 4: $K_2[TiO(C_2O_4)_2] \cdot 2H_2O$
Compound 5: $Na_2[TiO(C_2O_4)_2] \cdot 3H_2O$
Compound 6: $Ba[TiO(C_2O_4)_2] \cdot 4H_2O$
Compound 7: $Ca[TiO(C_2O_4)_2] \cdot 5H_2O$
Compound 8: $Na_2[WO_2(OH)_2(C_2O_4)] \cdot n\ H_2O$ (n = 1 to 3)
Compound 9: $(NH_4)_2[WO_3(C_2O_4)] \cdot H_2O$
Compound 10: $(NH_4)_2[MoO_3)(C_2O_4)] \cdot n\ H_2O$ (n = 1 to 3)
Compound 11: $Na_2[(MoO_3)(C_2O_4)] \cdot 3H_2O$
Compound 12: $K_4[Zr(C_2O_4)_4] \cdot 5H_2O$ Of these oxalate complexes, the compounds 1 and 2 are preferred for they produce the most efficient reaction. Moreover, they readily decompose to $CO_2$ at room temperature which makes them most desirable in the production of foamed polyimides as will be discussed below.

The catalyst concentration will vary depending primarily upon the particular catalyst selected and the specific reaction conditions employed. In general the amount of catalyst will fall in the range of about 0.5 to 15% by weight of the monomer or monomers employed.

In a preferred embodiment of the invention, especially when a foam polymeric product is desired there is employed in combination with oxalate complex catalyst an alkaline persulfate. The presence of the persulfate assists in breaking down the oxalate complex catalyst to evolve large amounts of $CO_2$. Suitable persulfates are alkali persulfates such as sodium and potassium persulfate and ammonium persulfate. When used, the persulfates are generally added in the same range as that of the oxalate complex catalyst.

The polymers produced by the method of the invention have the repeating unit of structure A or structure C, or both structures A and C and may be homopolymers of acrylamide or interpolymers including copolymers and terpolymers of acrylamide and at least one ethylenically unsaturated monomer copolymerizable therewith. The polymers produced by the method of the invention are curable and may be substantially linear or crosslinked polymeric materials depending primarily upon whether a crosslinking agent is employed in the reaction and/or the comonomers used have functional groups naturally crosslinkable during the polymerization.

Homopolymers prepared by the method of the invention may be represented by structure A or structure C or both structures A and C with the structure repeated at least 15 times, usually up to 50 or more.

Interpolymers or copolymers prepared by the method of the invention have the repeating units shown in structure D and structure E, wherein Z is H or an organic functional group. Preferably Z is selected from H,-COOR wherein R is H or alkyl, —$CH_2$—, —OH, $$-\overset{O}{\underset{}{C}}NH_2,$$

—CH, —$NH_2$, —C≡N, piperazine, hydantion, aryl or naphthyl and cyclohexyl groups. In these structures $m$ and $n$ represent respectively the average number of acrylamide monomer units and $CH_2$=CH-Z monomer units in the polymer per 100 monomer units of the polymer, the sum of $m + n$ totaling 100. Preferably n is about 50 to about 75 and $m$ is 50-25.

Particularly preferred terpolymers of the invention are solid crosslinked polymers comprising copolymerized acrylamide, acrylonitrile and a copolymerized ethylenically unsaturated carboxylic acid, ester or anhydride such as acrylic acid, itaconic acid, etc., and the anhydrides and esters, thereof.

Examples of suitable comonomers, one or more of which can be polymerized with acrylamide in accordance with the method of the invention, are the acrylates, and acrylate derivatives: piperazine, hydantion, cyclohexyl acrylate groups, and α-substituted acrylates wherein the α-substituent is alkyl such as methyl, ethyl, propyl and the like; aryl such as phenyl, naphthyl and the like; the ester moiety being alkyl such as methyl, ethyl, propyl and the like; aryl such as phenyl, naphthyl and the like; vinyl ethers, e.g. methyl, ethyl, propyl and higher alkyl; 2-(N,N diethanol amino) ethyl acrylate, acrylamide, and substituted acrylamides e.g. methacrylamide, N-methylacrylamide, N,N-dimethylacrylamide; N-vinylacetamide, acrylic acid, acrylonitrile, allyl acetate, allyl alcohol, crotonic acid, dimethylaminoethylvinyl sulfide, diethylhexyl maleate, didodecyl maleate, fumaramide, itaconic acid, methacrylic acid, methoxystyrene, methyl vinyl ketone, 3-methyl-N-vinylpyrrolidone, 2-methyl-5-vinylpyridine, styrene, trichloroethylene, vinylcaprolactam, vinylcarbazole, vinylimidazole, vinyl laurate, vinyl benzimidazole, 1,3- and 1,4-butanediol monomethacrylate, vinyloxazolidinone, vinyl oxyethylurea, vinyl propionate, vinyl pyridine, vinyl stearate, vinyl acetate (and the derived vinyl alcohol,) diolpiperazine acrylate (or diacrylate) derivatives, hydantion acrylate or diacrylate, epoxy hydantion acrylates or other alkyl or aryl epoxy acrylate derivatives, Zn, Mg, Ca, Ba, Pb, Na acrylates or methacrylates.

The homopolymers and interpolymers of the present invention may be crosslinked to provide tough, chemically stable, elastomeric products, highly insoluble in organic solvents, as well as in organic and inorganic acids and bases. The crosslinking agents that are suitably employed are those conventional crosslink agents containing two or more functional groups capable of taking part in the polymerization reaction so as to provide a polymeric material having a crosslinked three-dimensional structure. The crosslinking agent selected in any given case will generally depend upon the particular reactive groups on the polymeric chains to be crosslinked. Likewise, the concentration of crosslinking agent used will vary depending on the agent and the degree of crosslinking desired. In general, at least 2% up to 20% by weight based upon the monomers is employed. Accordingly, suitable crosslinking agents that have been found particularly applicable in the method of the invention are those having the structure:

$$R (Q)_p$$

wherein Q is selected from —OH, —SH, —Cl, —NCO,

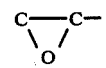

and

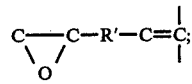

where R and R' are polyvalent organic radicals of 2 to 12 carbon atoms. R and R' are preferably divalent or trivalent aliphatic or aromatic hydrocarbons.

Illustrative of these crosslinking agents can be included ethylene glycol, propylene glycol, 1,2,3-propane triol, 1,2-ethane dithiol, 1,2,3-propane trithiol, 1,6-cyclohexane diol, 1,6-benzene diol, pentaerythritol, aryl, alkyl, hydantion diisocyanate derivatives, and other alkyl or aryl diisocyanate derivatives diethanolamine, triethanolamine, furan dianhydride, pyrazine dianhydride, pyromellitic dianhydride, urea, urine, melamine, melamine allyl derivatives, epihydrin alcohol, diacrylate derivatives, and the like.

Advantageously, flame retardants are included in the polymerization reaction of the invention. The preferred types of flame retardants are those which bond chemically to the polymer so as to provide prolonged flame resistance to the polymeric material. Illustrative of such polymers are halogenated dienes such as hexachlorobutadiene, poly (phosphoramidopentachloro dienylurea), poly (phosphamidopentachlorodienylurea), poly (phosphorylnitrure) and halogenated unsaturated organic salts and esters such as 1,1-dichlorovinyl diethyl phosphate, bis (β-chloroethyl) vinyl phosphate, triethanolamino bisallyl chlorophosphoric acid and Phosgard C22R. In general flame retardants are added in amounts ranging from 0.5 to 25% by weight of the monomers.

The polyimide homopolymers prepared by the invention range from viscous materials to solids depending upon their intended use and are characterized by average molecular weights of at least 1,000 up to 1,000,000 or more.

In the interpolymers of the invention, the proportions of the various monomer units and their distribution along the carbon-carbon chain, and the length of the chain can vary over a wide range, thereby providing a family of polymers having different molecular weights and solubilities and differing in other important properties which render certain of these polymers particularly suited for specific applications. As in the case of the homopolymers the interpolymers range from viscous materials to high molecular weight solids. In instances where one or more of the monomers contain crosslinkable groups, a solid crosslinked product will generally result. Thus, while the composition and structure of the interpolymers can vary over wide ranges, nevertheless the interpolymers comprise about 30 to 90 mole %, preferably 50 to 85 mole % acrylamide and 70 to 10 mole %, preferably 50 to 15 mole % of at least one copolymerizable ethylenically unsaturated monomer.

The polymerization of the monomer or monomers usually can be initiated at room temperature although some mild heating may be necessary in certain polymerization reactions. These reactions are exothermic and are accompanied by a release of heat causing an increase in reactant temperature. While normal temperature increases can be accomodated with no particular problem, too high of a rate for the exothermic polymerization reaction would cause a significant increase in temperature and "run away" polymerization. Thus, with most reactant systems it is preferred that the reaction temperature be conducted at about 20° to 60° C. If necessary, the reaction mixture may be cooled sufficiently to prevent excessive temperatures.

The method of the invention can be carried out by simply mixing thoroughly as by homogenization at room temperature the reactants and catalysts. If desired a mutual solvent for the reactants and catalysts can be included. Suitable solvents are dimenthyl formamide, dimethyl sulfoxide, alkanols, dioxane and ketones. The materials are continually stirred until the solution begins to gel which is generally in about 1 - 3 ½ hours. The gelling solution may then be case or poured into a desired form and the polymerization allowed to go to completion.

As a preferred embodiment of the present invention there is included in the polymerization reaction a cocatalyst strong inorganic acid such as sulfuric acid or phosphoric acid and preferably a mixture of such acids. It has been found that the presence of the acids increases the efficiency of the catalyst system in that they convert all the oxalic groups to $CO_2$ and $CO_2$ thereby preventing conversion of the oxalic acid groups to oxalate salts. When employed the acids are added in concentrations of about 1 to 45% by weight of monomer/catalyst.

Optionally, and as another embodiment of the invention, the polymerization may be assisted by effecting the reaction in the presence of radiation such as ultraviolet light, gamma ray, electron beam and other forms of ionizing radiation. Often this radiation will be used in place of the persulfate component. When used, the dosage of ionizing radiation will fall in the range of 0.01 Megarads/hr to 10 Megarads/hr.

According to one specific mode of preparing crosslinked polymeric compositions of the invention, a solution of one or more crosslinking agents such as urea in an acid such as phosphoric acid, sulfuric acid or mixtures thereof, is prepared.

There is then prepared a separate solution of the monomer or monomers in a suitable solvent such as dimethyl sulfoxide, alkanol, water and the like, which solution is added to the acid solution with cooling. Any flame retardants, dispersing agents and filler materials may then be added. Lastly, yet a third solution of the oxalate complex catalyst alone or in combination with the alkaline persulfate in either a solvent which is also a solvent for the monomers or in one of the monomers is prepared. This third solution is added to the mixture of previous solutions and the resulting solution brought to reaction temperature. As aforementioned the polymerization is complete within about 3 ½ hours, often within 1 or 2 hours.

Upon completion of the polymerization reaction, a polymeric foam product either of the homopolymer or interpolymers of the invention may be prepared by simply heating the polymer in the presence of air at an elevated temperature, for example, to a temperature of at least 150° C, usually up to 300° C, preferably about 200° C to 250° C. The heating effects a breakdown in the oxalate complex to evolve $CO_2$ which becoming entrapped in the polymer forms a foamed product.

The polymeric materials of the present invention have wide industrial application. In addition to the general fields of fiber, film and mold products, the foam products have excellent thermoisolation properties, very high flame resistance with a limiting oxygen index up to 95, very high chemical resistance and good physical properties in comparison with all organic foams and fibrous materials.

The following examples are included to further illustrate the present invention but are not to be considered as limiting the invention in any respect.

EXAMPLE I

The following compounds (given by weight ratios) are homogenized at room temperature:

| | |
|---|---|
| Sulfuric/Phosphoric Acid (8/2 ratio) | 25 |
| Urea Oxalate (or derivatives) | 3 |
| Acrylamide (or derivatives) | 12.5 |
| Hexachlorobutadiene | 5.5 |
| Dimethylformamide/$H_2O$ | 1.5/0.5 |
| Zinc methacrylate | 6.0 |
| Complex Oxalic (Compound 1) | 0.08 |
| 2-(N,N diethanolamino) ethyl acrylate | 3.5 |
| Potassium Persulfate | 0.04 |
| Poly(phosphoramido pentachloro dienyl urea) | 5.5 |

These materials are stirred in an open container until a homogeneous solution is obtained and is continued to be stirred for an additional 120 minutes. When the solution begins to gel the solution is poured into a form and polymerization allowed to go to completion forming an elastomeric solid.

Heating this solid to approximately 200° C in an oven or a tunnel (not requiring any special atmospheres) forms a fibrous foamed material in a few minutes.

EXAMPLE II

The process of Example I is repeated with the following composition:

| Sulfuric Acid (concentrated) or Phosphoric Acid (concentrated) | 18 |
|---|---|
| Ureaperoxidate (or derivatives) | 5 |
| Acrylamide (or derivatives) | 13 |
| Dimethylformamide | 3.3 |
| Furandianhydride (or other anhydrides) | 1 |
| Hexachlorobutadiene | 3.7 |
| Calcium methacrylate | 7.5 |
| 2-Chloroethylchlorophosphate | 1.5 |
| Poly(phospho amido penta chloro dienyl urea) | 4.0 |
| Complex Oxalic (Compound 1) | 0.01 |
| Potassium Persulfate | 0.01 |

EXAMPLE III

The process of Example I is followed using the following compositions:

| $H_2SO_4/H_3PO_4$ (4/1 ratio) | 15 |
|---|---|
| Urea (or derivatives) | 5 |
| Acrylamide (or derivatives) | 50 |
| Dimethylformamide/$H_2O$ (azeotrop mixture) | 5 |
| Hexachlorobutadiene | 3 |
| Triethanolaminobisdiallylchlorophosphoric acid | 2 |
| Complex Oxalic (Compound 2) | 0.01 |
| K Persulfate | 0.01 |
| Zinc acrylate | 6.0 |

EXAMPLE IV

The process of Example I is followed with the following compositions:

| $H_2SO_4/H_3PO_4$ (4/1 ratio) | 3 |
|---|---|
| Urea (derivatives) | 5 |
| Acrylamide (or derivatives) | 10 |
| Dimethylformamide | 1 |
| Epoxy -5,5 dimethylhydantion acrylate | 7.7 |
| Acrylonitrile | 1.5 |
| Barium methacrylate | 8.2 |
| Poly(phosphorylnitrure) | 5.5 |
| Hexachlorobutadiene | 5 |
| Complex Oxalic (Compound 2) | 0.01 |
| K Persulfate | 0.01 |

EXAMPLE V

Example IV is repeated except that persulfate is not used but ultraviolet light in the range of 3000 to 7000 A or ionizing radiation of about 0.5 Megarads/hr is employed. The time of reaction is 5 to 12 minutes to form the polymer material.

EXAMPLE VI

The process of Example I is followed using the following compositions:

| Sulfuric Acid | 10 |
|---|---|
| Phosphoric Acid | 4 |
| Ureaperoxide | 6 |
| Acrylamide | 6 |

-continued

| Acrylonitrile | 1 |
|---|---|
| Dimethylformamide | 2 |
| Furandianhydride | 0.1 |
| Hexachlorobutadiene | 1 |
| Zinc methacrylate | 4.8 |
| Complex Oxalic (Compound 1) | 0.01 |
| Poly(phosphor amido penta chloro dienyl urea) | 3.3 |
| Persulfate (K or $NH_4$) | 0.01 |

EXAMPLE VII

Example VI is repeated but substituting for the persulfate the radiation of Example V.

EXAMPLE VIII

Example VI is repeated with the addition of

| Itaconic Acid | 1 |
|---|---|
| Sodium acrylate | 3.5 | to the ingredients.

EXAMPLE IX

The process of Example I is followed with the compositions:

| Sulfuric Acid | 18 |
|---|---|
| Urea/(Urea Oxalate) (1.0/0.3 ratio) | 4 |
| Acrylamide | 20 |
| Hexachlorobutadiene | 4 |
| Ethanol | 15 |
| Poly(phosphoryl nitrure) | 7.5 |
| Complex Oxalic (Compound 2) | 0.08 |
| K Acrylate | 10.0 |
| K Persulfate | 0.03 |

EXAMPLE X

Example IX is repeated substituting for the persulfate the radiation of Example V.

EXAMPLE XI

A. The process of Example I is repeated with the following compositions:

| Sulfuric/Phosphoric Acids (4/1 ratio) | 10 |
|---|---|
| Acrylamide | 8 |
| Urine | 5 |
| Urea | 2 |
| Zinc Acrylate | 5.75 |
| Complex Oxalic (Compound 1) | 0.08 |
| Poly(phospho amido penta chloro dienyl urea) | 5.5 |
| Ammonium Persulfate | 0.04 |

This mixture will result in an elastomeric compound.

B. The following addition may be made to the mixture in Example XI A.:

| K methacrylate | 8.2 |
|---|---|
| Styrene/Acrylonitrile (3/1 ratio) | 0.5 to 2 |

This addition results in an improvement of the elastic properties of the material detailed in Example XI A.

C. The following addition may be made to the materials listed in Example XI A.:

| Isoprene | 0.5 to 3 |
|---|---|

-continued

| | |
|---|---|
| Dimethylformamide | 1 to 3 |

D. The following addition may be made to the materials in Example XI A.:

| | |
|---|---|
| Dianhydride (furan, pyrazine, pyromellitic or other anhydrides) | 0.01 to 0.1 |
| Dimethylformamide | 1 to 7 |

The resultant elastomer will have improved mechanical strength compared to the material listed in Example XI A.

EXAMPLE XII

The process of Example I is followed with the following compositions:

| | |
|---|---|
| Sulfuric Acid | 20 |
| Phosphoric Acid | 10 |
| Urea | 10 |
| Acrylamide | 30 |
| Acrylonitrile | 6 |
| Styrene | 6 |
| Zinc acrylate | 6.8 |
| Dimethylformamide | 4 |
| Poly(phosphor amido penta chloro dienyl urea) | 2.5 |
| Hexachlorobutadiene | 5 |

EXAMPLE XIII

The materials in Example XII are mixed with metal or metal oxides (aluminum, alumina, copper or others), glass or glass binder, in the following ratios:

0.5 to 2.5 part by weight of metal, metal oxide or glass
and
5 to 15 parts by weight of polymer solution.

These additions improve the physical properties of the material.

EXAMPLE XIV

To 43 units of phosphoric acid gradually is added 45 units of urea, while the mixture is stirred constantly. To decrease the viscosity of the solution the temperature is increased to about 30° C. When the urea is completely dissolved, there is added another dimethylsulfoxide solution containing:

| | |
|---|---|
| Acrylamide | 180 |
| Zinc methacrylate | 25 |
| Acrylonitrile | 53 |
| Poly(phosphoryl nitrure) | 10 |
| Methylmethacrylate | 40 |

Continuous stirring is maintained. Using another 9 to 14 units of methylmethacrylate 0.5 to 1.5 units of compound 1 is brought to a solution. This solution is then added to the previous mixture. The temperature is raised to 40° C; meanwhile the solution is stirred constantly. The solution will gel after some time, at which the stirring is stopped. After the material has fully polymerized, it is foamed at about 200° C.

EXAMPLE XV

The previous example is repeated with the addition to the phosphoric acid solution of 0.5% by weight of hexachlorobutadiene based on the monomers and 1.2% by weight melamine based on the urea. The resultant polymer is foamed at 190° C.

All the crosslinked polymeric products produced by Examples I through XV are fibrous materials thermostable to 150° C and flame resistant. When the fibrous material is held in a Bunsen burner flame (over 95% oxygen), the fibrous material carbonizes directly without flaming or developing much smoke, and when removed from the flame, the material does not flame and does not burn. The polymeric products when subjected to chemical solubility tests for 216 hours at room temperature were found not soluble in the following chemicals: water, aqueous alkaline solution (n/10 NaOH), sulfuric acid (conc. 98%), formic acid (conc. 90.3%), phosphoric acid (conc.), acetic acid (conc.), oxidant mixture $K_2Cr_2O_7$-$H_2SO_4$ conc.), acetic anhydride, benzene, aromatic hydrocarbons (gasoline), cyclohexanone, chlorobenzene, tetrahydrofuran (THF), methanol, hexane, dichloromethane, methylenechloride, ethylene chloro bromide, pyridine, dimethylformamide, dimethylsulfoxide, ammonium hydroxide (conc. 28.9%).

The specific gravity of the products falls in the range of approximately 0.018 to 0.5 and the products exhibit no liquid absorption. Further, the products are characterized by a relative humidity of 2.5 – 3.5% (no static electricity build-up) and high thermal expansion and shock absorption properties.

I claim:

1. A method for the production of an elastomeric, chemically stable polymer which consists essentially of polymerizing in a liquid medium a member of the group selected from acrylamide and mixtures of acrylamide and at least one ethylenically unsaturated monomer copolymerizable therewith in the presence of a catalyst having the structure:

$$Q\left[(Z)_a \leftarrow \overset{(Z)_b}{\underset{(Z)_c}{Me}} \left(\begin{array}{c}OC\overset{O}{\|}\\ \diagdown \\ OC\underset{\|}{\diagup}(CH_2)_x\\ O\end{array}\right)_d\right] \cdot n\,H_2O$$

wherein:
Q = $NH_4$, or metals of group IA and IIA
n = 2 to 5

$$Z = O, H_2O, -OH \text{ and } \begin{array}{c}-OC\overset{O}{\diagup\!\!\!\|}\\ \diagdown(CH_2)_x\\ -OC\diagup\\ \diagdown O\end{array}$$

Me = Ti, Mn, Mo, Zr or W
x = 0 to 1
a,b,c each = 0 to 1
a+b+c+d = valence of Me.

2. The method of claim 1 wherein the catalyst is $K[Mn(C_2O_4)_2(H_2O)_2] \cdot 2H_2O$.

3. The method of claim 1 wherein the catalyst is $K[Mn(C_3H_2O_4)_2(H_2O)_2] \cdot 2H_2O$.

4. The method of claim 1 wherein the catalyst is $(NH_4)_2[TiO(C_2O_4)_2] \cdot 3H_2O$ 5. The method of claim 1 wherein the catalyst is $K_2[TiO(C_2O_4)_2] \cdot 2H_2O$ 6. The method of claim 1 wherein the catalyst is $Na_2[TiO(C_2O_4)_2] \cdot 3H_2O$ 7. The method of claim 1 wherein the catalyst is $[Ba[TiO(C_2O_4)_2] \cdot 4H_2O$ 8. The method of claim 1 wherein the catalyst is $Ca[TiO(C_2O_4)_2] \cdot 5H_2O$ 9. The method of claim 1 wherein the catalyst is $Na_2[WO_2(OH)_2(C_2O_4)] \cdot n H_2O$ (n = 1 to 3)

10. The method of claim 1 wherein the catalyst is $(NH_4)_2[WO_3(C_2O_4)] \cdot H_2O$ 11. The method of claim 1 wherein the catalyst is $(NH_4)_2[MoO_3)(C_2O_4)] \cdot n H_2O$ (n = 1 to 3)

12. The method of claim 1 wherein the catalyst is $Na_2[(MoO_3)(C_2O_4)] \cdot 3H_2O$ 13. The method of claim 1 wherein the catalyst is $K_4[Zr(C_2O_4)_4] \cdot 5H_2O$ 14. The method of claim 1 wherein the polymerization is conducted at a temperature of about 20° to 150° C.

15. The method of claim 1 wherein the polymerization is of a mixture of acrylamide and at least one ethylenically unsaturated monomer.

16. The method of claim 15 wherein the ethylenically unsaturated monomer is selected from acrylic and methacrylic acids, 3 acryloxy -5,5-dimethylhydantion -1-propionic acid, and esters and anhydrides thereof.

17. The method of claim 15 wherein the ethylenically unsaturated monomer includes a mixture of acrylic acid and acrylonitrile.

18. The method of claim 15 wherein the ethylenically unsaturated monomer includes a mixture of acrylonitrile and itaconic acid.

19. The method of claim 1 wherein an alkaline persulfate is employed as an initiator in combination with said catalyst.

20. The method of claim 1 wherein a redox catalyst is employed as an initiator in combination with said catalyst.

21. The method of claim 1 wherein a combination of redox catalyst and an alkaline persulfate is employed as an initiator in combination with said catalyst.

22. The method of claim 1 wherein the polymerization is conducted in the presence of ionizing radiation as well as in the presence of said catalyst.

23. The method of claim 1 wherein the polymerization is conducted in the presence of an electron beam radiation as well as in the presence of said catalyst.

24. The method of claim 1 wherein the polyermization is conducted in the presence of UV radiation as well as in the presence of said catalyst.

25. The method of claim 1 wherein the polymerization is conducted in the presence of crosslinking agents.

26. The method of claim 25 wherein the crosslinking agent is selected from the group consisting of urea, ureido, thiourea, diol, thio, epoxy, epoxy-acryloxy, diisocyanate, epoxy-diisocyanate, melamine, 2, 4-diamino-6-vinyl-1,3,5-triazine, hydrazine, vinyl hydrazine and derivatives thereof.

27. The method of claim 25 wherein the polymerization is conducted in the presence of at least one flame retardant.

28. The method of claim 27 wherein the flame retardants are selected from the group consisting of hexachlorobutadienne, 1,1-dichlorovinylethyl phosphate, triethanolaminobisallylchlorophosphoric acid, bix (β-chloroethyl) vinyl phosphonate, poly (phosphorylnitrure), poly (phosphoamidopentachlorodienyl urea), poly (phosphoramidopentachlorodienyl urea) and mixtures thereof.

29. The method of claim 27 wherein the polymerization is conducted in the presence of an alkaline persulfate.

30. The method of claim 1 wherein the polymeric product resulting from the polymerization is foamed by heating the product to a temperature of 30° to 300° C.

31. The method of claim 15 wherein the polymeric product resulting from the polymerization is foamed by heating the product to a temperature of 30° to 300° C.

32. The method of claim 16 wherein the polymeric product resulting from the polymerization is foamed by heating the product to a temperature of 30° to 300° C.

33. The elastomeric chemically stable polymer product produced by the method of claim 1.

34. The elastomeric chemically stable polymer product produced by the method of claim 15.

35. The elastomeric chemically stable polymer product produced by the method of claim 17.

36. The elastomeric chemically stable polymer product produced by the method of claim 25.

37. The elastomeric chemically stable polymer product produced by the method of claim 27.

38. The elastomeric chemically stable polymer product produced by the method of claim 31.

39. The elastomeric chemically stable polymer product produced by the method of claim 32.

40. The method of claim 1, wherein Q is sodium, potassium, ammonium, calcium or barium.

* * * * *